United States Patent
Holverson et al.

(10) Patent No.: US 11,072,035 B2
(45) Date of Patent: Jul. 27, 2021

(54) AUXILIARY WELDING HEATING SYSTEM

(75) Inventors: Todd Earl Holverson, Appleton, WI (US); Jerald Edward Jones, Golden, CO (US); Valerie Lisa Rhoades, Golden, CO (US); Stephen King Madden, Mansfield, OH (US)

(73) Assignee: Illinois Tool Works Inc., Glenview, IL (US)

( * ) Notice: Subject to any disclaimer, the term of this patent is extended or adjusted under 35 U.S.C. 154(b) by 569 days.

(21) Appl. No.: 13/111,433

(22) Filed: May 19, 2011

(65) Prior Publication Data

US 2011/0284527 A1    Nov. 24, 2011

Related U.S. Application Data

(60) Provisional application No. 61/346,961, filed on May 21, 2010.

(51) Int. Cl.
*B23K 9/32* (2006.01)
*B23K 9/235* (2006.01)
*B23K 9/10* (2006.01)

(52) U.S. Cl.
CPC .............. *B23K 9/32* (2013.01); *B23K 9/1006* (2013.01); *B23K 9/235* (2013.01)

(58) Field of Classification Search
CPC .... B23K 9/1006; B23K 9/0953; B23K 28/00; B23K 9/235; B23K 13/00; B23K 28/02; B23K 9/00
USPC ............... 219/660, 61, 607, 602, 612, 137.2
See application file for complete search history.

(56) References Cited

U.S. PATENT DOCUMENTS

| | | | |
|---|---|---|---|
| 2,528,758 A * | 11/1950 | King | B23K 13/02 219/603 |
| 2,753,427 A | 7/1956 | Yenni | |
| 3,288,982 A | 11/1966 | Suzuki et al. | |
| 3,612,806 A | 10/1971 | Lewis et al. | |
| 3,619,548 A | 11/1971 | Cavagnero | |

(Continued)

FOREIGN PATENT DOCUMENTS

| | | |
|---|---|---|
| CN | 1917970 | 2/2007 |
| CN | 101213318 | 7/2008 |

(Continued)

OTHER PUBLICATIONS

International Search Report for application No. PCT/US2011/024577 dated Aug. 18, 2011.

(Continued)

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

An auxiliary welding heating system includes an induction heating coil disposed adjacent to a welding torch or plasma cutter. The auxiliary welding heating system further includes an induction power supply configured to generate an alternating current and a step-down transformer coupled to the induction power supply. The induction heating coil is coupled to the step-down transformer and is configured to receive the alternating current and induce eddy currents in a welding work piece to heat the welding work piece before an advancing welding arc or plasma cut to a homologous temperature of at least approximately 0.5.

19 Claims, 4 Drawing Sheets

(56) References Cited

U.S. PATENT DOCUMENTS

| | | | | |
|---|---|---|---|---|
| 4,709,569 A * | 12/1987 | Sabroff | ....................... | B21J 1/06 |
| | | | | 72/340 |
| 4,795,882 A * | 1/1989 | Hardwick | ............... | B23K 9/126 |
| | | | | 219/121.48 |
| 4,906,805 A * | 3/1990 | Rudd | ..................... | B23K 13/01 |
| | | | | 219/57 |
| 5,319,179 A | 6/1994 | Joecks | | |
| 5,343,023 A | 8/1994 | Geissler | | |
| 5,461,215 A | 10/1995 | Haldeman | | |
| 5,573,613 A * | 11/1996 | Lunden | ............... | B29C 66/1122 |
| | | | | 156/272.4 |
| 5,708,253 A * | 1/1998 | Bloch et al. | ............. | 219/130.01 |
| 6,043,471 A | 3/2000 | Wiseman | | |
| 6,162,509 A * | 12/2000 | Cherico et al. | ................ | 427/456 |
| 6,265,701 B1 * | 7/2001 | Bickel et al. | ................. | 219/617 |
| 6,333,484 B1 | 12/2001 | Foster | | |
| 6,365,236 B1 * | 4/2002 | Maloney | ............... | C23C 14/083 |
| | | | | 427/250 |
| 6,861,617 B2 | 3/2005 | Dull et al. | | |
| 7,156,277 B2 | 1/2007 | Ishikawa et al. | | |
| 7,922,812 B2 * | 4/2011 | Ciulik et al. | ....................... | 117/7 |
| 8,695,375 B2 | 4/2014 | Kirkwood | | |
| 2006/0289492 A1 * | 12/2006 | Thomas et al. | ............... | 219/660 |
| 2009/0134133 A1 | 5/2009 | Mokadem | | |
| 2009/0205453 A1 * | 8/2009 | Oyekanmi | ............... | B21K 1/30 |
| | | | | 74/434 |
| 2010/0204824 A1 * | 8/2010 | Luce | ..................... | B25J 9/1687 |
| | | | | 700/219 |

FOREIGN PATENT DOCUMENTS

| | | | | |
|---|---|---|---|---|
| CN | 101346800 | | 1/2009 | |
| CN | 101491856 | | 7/2009 | |
| CN | 103038016 | | 4/2013 | |
| CN | 202934266 | | 5/2013 | |
| CN | 103322569 | | 9/2013 | |
| DE | 10047492 | A1 | 4/2002 | |
| DE | 102013104548 | | 3/2014 | |
| EP | 1149653 | | 10/2001 | |
| FR | 2823459 | | 10/2002 | |
| GB | 1460140 | | 12/1976 | |
| GB | 2463694 | A | 3/2010 | |
| JP | 06015447 | A * | 1/1994 | ............. B23K 9/025 |
| RU | 2077415 | | 4/1997 | |
| RU | 2098247 | | 12/1997 | |
| RU | 2125310 | | 1/1999 | |
| WO | 0193641 | | 12/2001 | |

OTHER PUBLICATIONS

International Search Report from PCT application No. PCT/US2015/055185, dated Feb. 12, 2016, 14 pgs.

International Search Report from PCT application No. PCT/US2015/055186, dated Feb. 10, 2016, 14 pgs.

European Office Communication Appln No. 11 722 700.9 dated Oct. 29, 2020.

* cited by examiner

AUXILIARY WELDING HEATING SYSTEM

CROSS REFERENCE TO RELATED APPLICATIONS

This application is a Non-Provisional Patent Application of U.S. Provisional Patent Application No. 61/346,961 entitled "High Deposition Arc Welding", filed May 21, 2010, which is herein incorporated by reference.

BACKGROUND

The invention relates generally to welding or cutting systems, and, more particularly, to an induction heating system for a welding or cutting process.

Welding is a process that has become increasingly ubiquitous in various industries and applications. Such welding operations are used for many types of heavy fabrication in various environments both in-shop as well as in the field. For example, welding operations may be used to fabricate pipelines, bridges, building structures, oil production facilities, petroleum storage tanks, water towers, and many other structures and components. Moreover, a wide range of metals having various compositions, sizes, geometries, and so forth may be formed or joined using welding processes. For example, large metal plates (e.g., ½" in thickness or greater) may be joined and welded end to end to form a "butt weld". Similar joints may be formed, for example, between sections of pipe. However, butt welds can require a large amount of consumables, such as fill material, and a number of weld passes to create a high quality weld. Additionally, metal plates to be welded may require preparation, such as cutting or machining the edges of the components to be welded. For example, the edges of one or both of two components may be beveled prior to being welded. Unfortunately, as the thickness of the plates to be welded increases, welding time, welding consumables, weld distortion, and cost of plate preparation increase, while welding productivity (e.g., welding speed) decreases.

In certain applications, it may be desirable to preheat the work pieces to a desired temperature range. This may assist in reaching a desired welding temperature, with additional heat being added by the welding arc. Heating arrangements of this type may rely, for example, on induction heating coils that are wrapped around the work pieces and run for a predetermined time, or until a desired temperature is reached. The coils are then removed, and the welding operation may proceed. Systems have also been proposed that rely on lasers for heating. All of these arrangements are somewhat inefficient, however, and can be quite expensive. Moreover, depending upon the type of heat source, these arrangements may not allow for reaching a more elevated temperature as might be desired for more massive work pieces.

BRIEF DESCRIPTION

In an exemplary embodiment, a welding system includes a welding power supply, a wire feeder coupled to the welding power supply, and a welding torch coupled to the wire feeder and configured to output wire from the wire feeder to produce a welding arc based upon power from the welding power supply. The welding system further includes an induction heating system disposed adjacent to the welding torch and configured to heat a localized area of a work piece ahead of the welding arc to a homologous temperature of at least approximately 0.5.

In another exemplary embodiment, an auxiliary welding heating system includes an induction power supply configured to generate an alternating current, a step-down transformer coupled to the induction power supply and an induction heating coil disposed adjacent to a welding torch. The induction heating coil is coupled to the step-down transformer and is configured to receive the alternating current and induce eddy currents in a welding work piece to heat the welding work piece before an advancing welding arc to a homologous temperature of at least approximately 0.5.

In a further embodiment, a method for heating a welding work piece includes disposing an induction heating coil configured to receive an alternating current and induce eddy currents in a welding work piece adjacent to the welding work piece and ahead of a welding torch in the direction of a weld. The method further includes generating the alternating current with an induction power supply, transferring the alternating current from the induction power supply to a step-down transformer, and transferring the alternating current from the step-down transformer to the induction heating coil.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of an induction heating system configured to heat a weld location ahead of an arc welding process are described. The induction heating system is adapted to heat a local area of a weld joint to elevated temperatures just before the welding arc reaches the weld location. The heat produced by the welding arc is then used to bring the work piece above the melting point and to melt the welding wire electrode. As a result, the welding process can proceed at a faster rate, and/or with more penetration and/or with better mechanical characteristics thereby increasing the productivity and/or quality of the welding process. Moreover, heating is performed much more locally than with previous induction heating techniques. The induction heating system includes an induction heating coil that is positioned near the surface of the work piece to be welded and adjacent to a welding torch. An alternating current produced by a power supply flows through the induction heating coil, which induces eddy currents in the work piece to be welded. The flow of the eddy currents through the work piece causes resistance heating of the work piece. By controlling the frequency of the alternating current delivered to the induction coil, the distance of the induction coil from the surface of the work piece, and the speed of advancement of the induction coil, the temperature to which the work piece is heated can be controlled immediately in front of a progressing weld. Specifically, the work piece may be heated to a homologous temperature of 0.5 or greater. As used in the present disclosure, the "homologous temperature" of a material refers to the ratio of the actual temperature of the material to the melting temperature of the material, both expressed in absolute temperature terms (e.g., degrees Kelvin). The system described below may be used with a variety of different welding processes. For example, the induction heating system may be used for submerged arc welding (SAW), fluxed core arc welding (FCAW), metal core arc welding (MCAW), friction stir welding (FSW), stud welding, flash butt welding, plasma welding, spot welding, seam welding, laser welding, gas tungsten arc welding (GTAW), and so forth.

Figure 1:
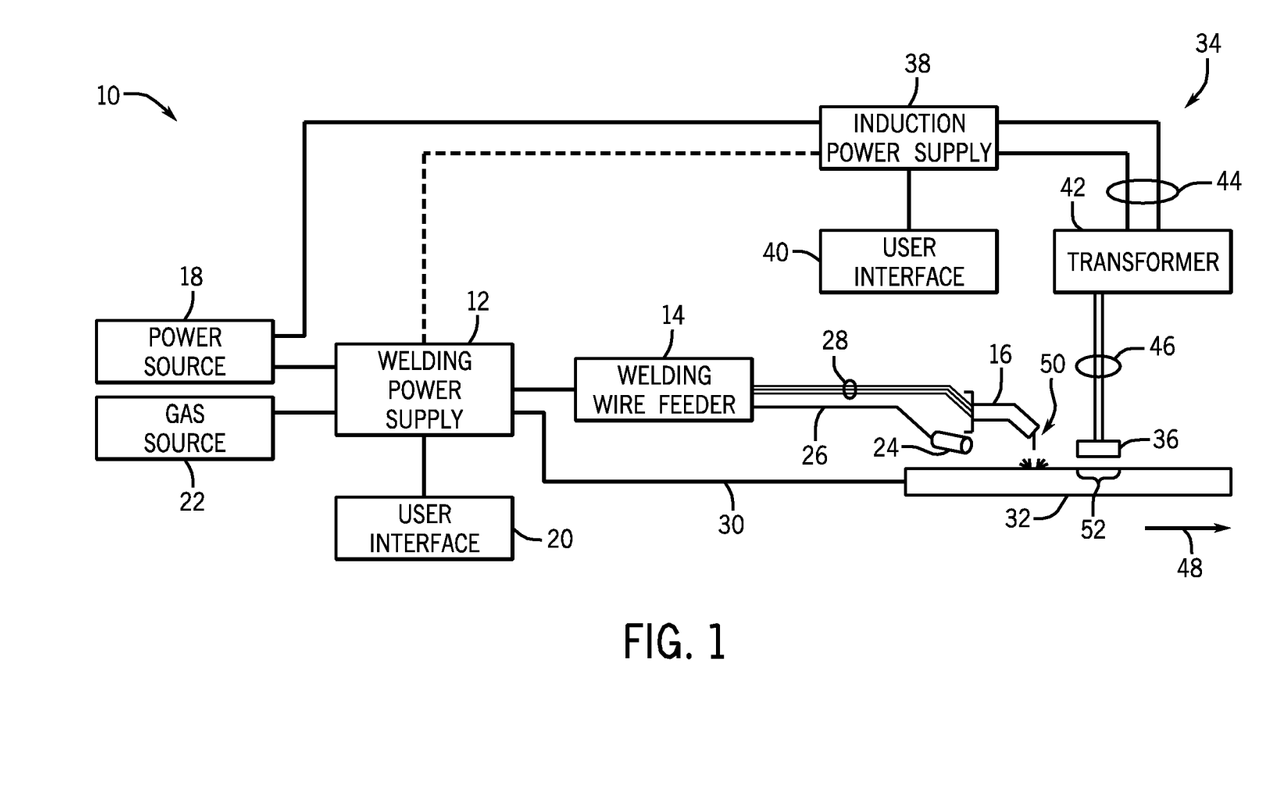
FIG. 1 is a block diagram of an exemplary welding system including an induction heating system configured to increase temperatures of a weld location ahead of the welding process.

Turning now to the drawings, FIG. 1 illustrates an exemplary welding system 10 which powers, controls, and provides supplies to a welding operation. The welding system 10 includes a welding power supply 12, a wire feeder 14, and a welding torch 16. The power supply 12 may be a power converter or an inverter based welding power supply requiring a power source 18. Many different circuit designs may be provided in the power source, and many different welding regimes may be envisaged (e.g., direct current, alternating current, pulsed, short circuit, etc. Any of these conventional circuits and process technologies may be used in conjunction with the present induction heating techniques. In other embodiments, the welding power supply 12 may be a generator or alternator welding power supply which may include an internal combustion engine. The welding power supply 12 may also include a user interface 20 for adjusting various welding parameters such as voltage and current, and for connecting a power source 18, if required. Additionally, a gas source 22 may be coupled to the welding power supply 12. The gas source 22 is the source of the shielding gas that is supplied to the welding torch 16. The gas source 22 also supplies shielding gas to an auxiliary shielding gas diffuser 24. For example, in certain embodiments, the gas source 22 may supply argon gas. As will be appreciated, the shielding gas is applied to the location of the liquid weld pool by the welding torch 16 and the auxiliary gas diffuser 24 to prevent absorption of atmospheric gases which may cause metallurgical damage to the weld. As shown, the welding power supply 12 is coupled to the welding wire feeder 14. For example, the welding power supply 12 may be couple to the welding wire feeder 14 by a feeder power lead, a weld cable, a gas hose, and a control cable.

The welding wire feeder 14 shown in the illustrated embodiment provides welding wire to the welding torch 16 for use in the welding operation. A variety of welding wires may be used. For example, the welding wire may be solid carbon steel, solid aluminum, solid stainless steel, composite and flux cored wire, and so forth. The invention may be used with any suitable type of electrode, and any suitable wire composition. Furthermore, the thickness of the welding wire may vary depending on the welding application for which the welding wire is used. For example, the welding wire may be 0.045, 0.052, 1/16, 3/32, 1/8, or any other diameter. Furthermore, the welding wire feeder 14 may enclose a variety of internal components such as a wire feed drive system, an electric motor assembly, an electric motor, and so forth. The welding wire feeder 14 may further include a control panel (not shown) that allows a user to set one or more wire feed parameters, such as wire feed speed. In the illustrated embodiment, the auxiliary shielding gas diffuser 24 is also coupled to the welding wire feeder 14 by a gas hose 26. However, the welding wire feeder 14 may be used with any wire feeding process including gas operations (gas metal arc welding (GMAW)) or gasless operations (shielded metal arc welding (SMAW) or self shielding flux cored arc welding (FCAW)).

As shown, the welding wire is fed to the welding torch 16 through a first cable 28. The first cable 28 may also supply gas to the welding torch 16. As further shown, a second cable 30 couples the welding power supply 12 to a work piece 32 (typically via a clamp) to complete the circuit between the welding power supply 12 and the welding torch 16 during a welding operation.

The exemplary welding system 10 also includes an induction heating system 34. As mentioned above, the induction heating system 34 includes an induction heating coil 36 and an induction power supply 38. The induction power supply 38 includes a user interface 40. The user interface 40 may include buttons, knobs, dials, and so forth to allow an operator to regulate various operating parameters of the induction power supply 38. For example, the user interface 40 may be configured to enable an operator to set and adjust the frequency of the alternating current produced by the induction power supply 38. Similarly, the user interface 40 may enable an operator to select a desired output temperature of the induction heating coil 36. The user interface 40 may also include one or more displays configured to provide system feedback to the operator (e.g., real-time temperature of the induction heating coil 36, travel speed of the induction heating coil 36 relative to the work piece 32, and so forth). The induction power supply 38 is coupled to a step-down transformer 42 with electrical wire conductors 44. More specifically, two electrical wire conductors 44 are routed from the induction power supply 38 to the transformer 42, and each electrical wire conductor 44 is routed inside a flexible tube or conduit. Furthermore, the induction heating system 34 may be an air-cooled or a liquid-cooled system. For example, a coolant may flow inside the flexible tubes routing each of the electrical wire conductors 44. In certain embodiments, one flexible tube routing an electrical wire conductor 44 contains a flowing coolant which enters transformer 42, and another flexible tube routing an electrical wire conductor 44 contains a flowing cooling which flows from the transformer to a heat exchanger or other device that removes heat from the coolant.

The alternating electrical current exits the transformer 42 and is supplied to the induction heating coil 36 by electrical conductors 46. As discussed in detail below, the electrical conductors 46 may have a hollow core and may also route the flowing coolant through the induction heating coil 36. In the illustrated embodiment, the induction heating coil 36 is disposed proximate to the work piece 32. As the alternating current flows through the induction heating coil 36, eddy currents are generated and induced within the work piece 32. The eddy currents flow against the electrical resistivity of the work piece 32, thereby generating localized heat in the work piece 32. As shown, the induction heating coil 36 is positioned ahead of the welding torch 16. In other words, for a welding torch 16 operating and traveling in a direction 48, the induction heating coil 36 is placed in front of the welding torch 16 (i.e., along the weld joint and before a welding arc 50 created by the welding torch 16). As a result, the induction heating coil 36 heats a localized area 52 of the work piece 32 immediately ahead of the welding arc 50, thereby raising the temperature of the localized area 52 just ahead of the welding arc 50. For example, the induction heating coil 36 may raise the temperature of the localized area 52 to a homologous temperature of approximately 0.5, 0.55, 0.6, 0.65, 0.7 0.75, or greater. As will be appreciated by those skilled in the art, such temperatures are generally substantially higher than conventional "preheat" temperatures.

For example, the work piece 32 may be made of steel and may have a melting temperature of approximately 1800 K. For the steel work piece 32, the induction heating coil 36 may heat the localized area 52 to approximately 1300 K (i.e., a homologous temperature of approximately 0.72). For further example, the work piece 32 may be made of aluminum and may have a melting temperature of approximately 933 K. For the aluminum work piece 32, the induction heating coil 36 may heat the localized area 52 to approximately 622 K (i.e., a homologous temperature of approximately 0.66). In other words, the induction heating coil 36 may provide approximately half or over half of the heat required to melt the localized area 52 of the work piece 32. Consequently, as the welding torch 16 travels in the direction 48, less heat from welding arc 50 is needed to bring the localized area 52 of the work piece 32 to melting temperature. Therefore, more heat generated by the welding arc 50 may be used to melt the welding wire, which enables the welding torch 16 to complete the weld of the work piece 32 at higher speeds.

As shown, the welding power supply 12 and the induction power supply 38 may also be coupled. For example, the welding power supply 12 and the induction power supply 38 may be coupled by a hard wire, through a wireless connection, over a network, and so forth. As discussed in detail below, the welding power supply 12 and the induction power supply 38 may exchange data and information during the operation of the exemplary welding system 10. More particularly, the welding power supply 12 and the induction power supply 38 may function in cooperation (e.g., utilize feedback from one another) to adjust various operating parameters of the exemplary welding system 10.

It should be noted that modifications to the exemplary welding system 10 of FIG. 1 may be made in accordance with aspects of the present invention. Although the illustrated embodiments are described in the context of an arc welding process, the features of the invention may be utilized with a variety of other suitable welding or cutting systems and processes. For example, the induction heating system 34 may be used with a plasma cutting system or with a plate bending system. More specifically, the induction heating system 34 may be disposed ahead of a plasma cutter to increase the temperature of a localized area (i.e., raise the temperature of the localized area to a homologous temperature of at least 0.5) ahead of the plasma cut, thereby enabling increased cutting speeds. Furthermore, while the induction heating system 34 is positioned ahead of the welding torch 16 in the present embodiment, the induction heating system 34 may be positioned in other locations. For example, the induction heating system 34 may be positioned behind the welding torch 16 to provide a heat treatment to a weld location after the work piece 32 is welded and fused. Similarly, certain embodiments may include more than one induction heating system 34 or coil (i.e., a first induction heating system 34 or coil positioned ahead of the welding torch 16 to raise the temperature of the localized area 52 to a homologous temperature of at least 0.5 prior to welding, and a second heating system 34 positioned behind the welding torch 16 to provide a heat treatment of a weld location that has been fused).

Figure 2:
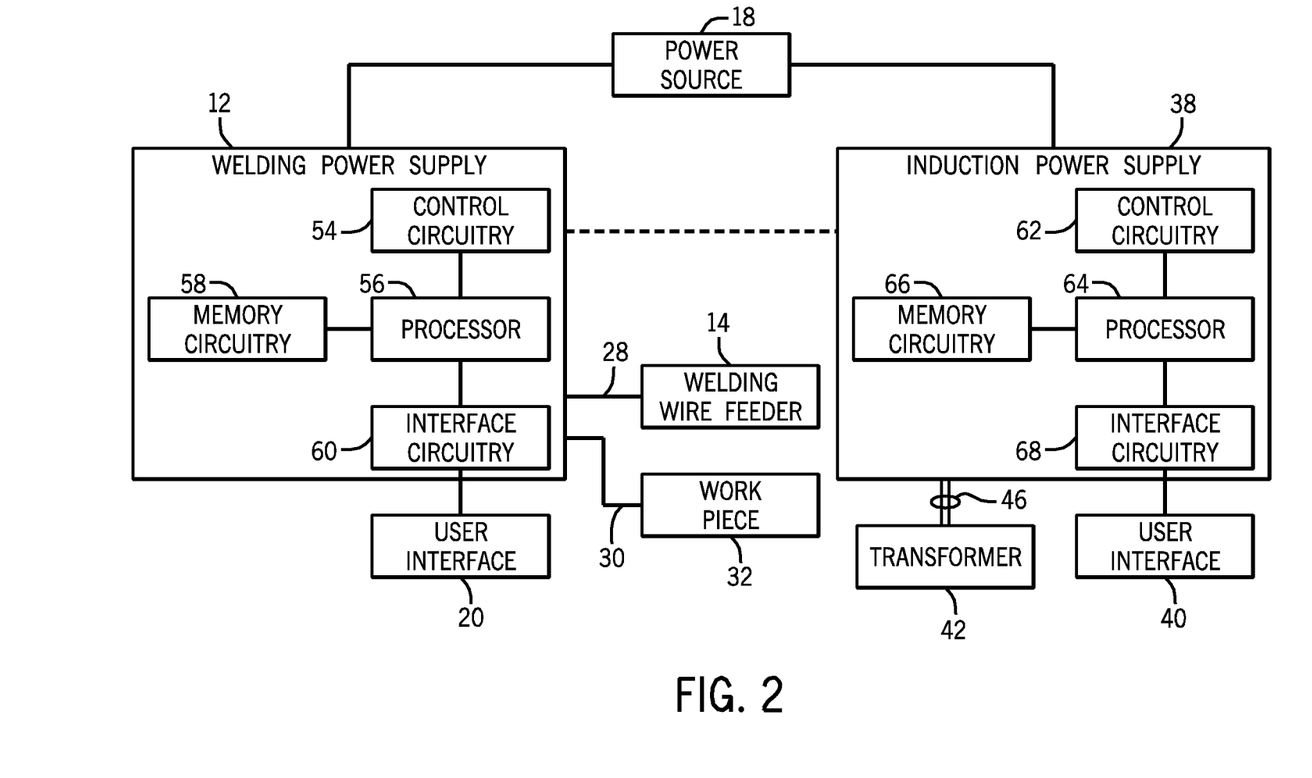
FIG. 2 is a block diagram illustrating exemplary functional components of the welding system and induction heating system of FIG. 1 in accordance with aspects of the present disclosure.

FIG. 2 is a block diagram illustrating certain of the internal components of the exemplary welding system 10. As discussed above, the power source 18 may power the welding power supply 12 and/or the induction power supply 38. The welding power supply 12 provides power to the welding wire feeder 14, and the welding power supply 12 is coupled to the work piece 32, thereby to completing the circuit between the welding power supply 12 and the welding torch 16 during a welding operation. The induction power supply 38 generates an alternating electrical current that is supplied to the transformer 42, which subsequently routes the current to the induction heating coil 36. As mentioned above, the welding power supply 12 and the induction power supply 38 may be coupled and configured to exchange information and data (e.g., operating parameters, settings, user input, etc) to enable the welding power supply 12 and the induction power supply 38 to function cooperatively.

The welding power supply 12 includes several internal components to regulate various operating parameters of the welding system 10. In the illustrated embodiment, the welding power supply 12 includes control circuitry 54, a processor 56, memory circuitry 58, and interface circuitry 60. The control circuitry 54 is configured to apply control signals to the welding power supply 12 and/or the welding wire feeder 14. For example, the control circuitry 54 may provide control signals to the welding wire feeder 14 relating to the voltage or current provided by the welding power supply 12. The control circuitry 54 may also provide control signals for regulating the operation of the welding wire feeder 14 such as pulse width modulated (PWM) signals to regulate a duty cycle for a motor assembly in the welding wire feeder 14, and so forth.

The control circuitry 54 is further coupled to the processor 56, memory circuitry 58 and interface circuitry 60. The interface circuitry 60 is coupled to the user interface 20 of the welding power supply 12. As discussed above, the user interface 20 is configured to enable an operator to input and control various settings of the welding power supply 12. For example, the user interface 20 may include a menu for selecting a desired voltage or current output to the welding wire feeder 14. Additionally, the user interface 20 may include a menu or list of welding processes or welding wire materials and diameters. As will be appreciated, different welding processes, welding wire materials, and welding wire diameters may have different characteristics and may require differing configurations for various operating parameters. For example, configuration parameters requiring differing values may include voltage output, current output, wire feed speed, wire feed torque, and so forth. Preset values for such configuration parameters, as well as others, may be stored in the memory circuitry 58 for each of a variety of welding processes, welding wire materials, and welding wire diameters.

By way of example, a user may select a welding process from a menu of a plurality of different welding processes displayed on the user interface 20 of the welding power supply 12. The user interface 20 communicates the selection of the welding process to the interface circuitry 60, which communicates the selection to the processor 56. The processor 56 then retrieves the particular configuration parameters for the welding process stored in the memory circuitry 58. Thereafter, the processor 56 sends the configuration parameters to the control circuitry 54 in order that the control circuitry 54 may apply appropriate control signals to the welding wire feeder 14. In certain embodiments, as discussed below, the control circuitry 54 of the welding power supply 12 may also communicate the configuration parameters to the induction power supply 38.

In the illustrated embodiment, the induction power supply 38 includes control circuitry 62, a processor 64, memory circuitry 66, and interface circuitry 68. The control circuitry 62 is configured to apply control signals to the induction power supply 38 and/or the transformer 42. For example, the control circuitry 62 may provide control signals relating to the alternating electrical current (e.g., alternating current frequency) supplied by the induction power supply 38 to the transformer 42. Additionally, the control circuitry 62 may regulate the operation of a cooling system used with the induction power supply 38 and/or the transformer 42. As mentioned above, the induction heating system 34 may use air or a coolant to provide circulating cooling throughout the induction heating system 34. For example, the control circuitry 62 may regulate a flow of a liquid coolant through the transformer 42 and the induction heating coil 36 to maintain a desired temperature of the induction heating system 34.

The control circuitry 62 is further coupled to the processor 64, memory circuitry 66, and interface circuitry 68. The interface circuitry 68 is coupled to the user interface 40 of the induction power supply 38. As mentioned above, the user interface 40 of the induction power supply 38 enables an operator to regulate one or more operating parameters or settings of the induction power supply system 38. For example, the user interface 40 may enable a user to select a particular design of the induction heating coil 36 from a menu of designs. As will be appreciated, different induction heating coil 36 designs may have different configuration parameters. For example, different design may have different maximum operating temperatures, and may require different frequencies of alternating current to achieve a desired temperature. Similarly, the coolant used to cool the induction heating system 34 may have different configuration parameters (e.g., heat transfer coefficients, viscosities, flow rates, and so forth). Preset values for such configuration parameters, as well as others, may be stored in the memory circuitry 66. For example, the user interface 40 may communicate a user selection of the induction heating coil 36 designs to the interface circuitry 68, which may communicate the selection to the processor 64. The processor 64 may then retrieve the particular configuration parameters for the induction heating coil 36 stored in the memory circuitry 66. Thereafter, the processor 64 sends the configuration parameters to the control circuitry 62 in order that the control circuitry 62 may apply appropriate control signals to the induction power supply 38 and the transformer 42.

As mentioned above, the welding power supply 12 and the induction power supply 38 may be coupled to one another by a hard wire, wireless connection, network connection, or the like. In particular, the welding power supply 12 and the induction power supply 38 may be configured to send and receive data and information to one another relating to the operating of the welding system 10. For example, the welding power supply 12 and the induction power supply 38 may communicate with one another to coordinate the speed of the induction heating coil 36 and the welding torch 16 along the work piece 32. As will be appreciated, in certain embodiments, the induction heating coil 36 and the welding torch 16 are both designed for automated operation. As a result, the welding power supply 12 and the induction power supply 38 may be coupled and configured to communicate and maintain a constant distance between the induction heating coil 36 and the welding arc 50, as the induction heating coil 36 and the welding torch 16 travel along the work piece 32 in the direction 48. For example, the welding torch 16 and the induction heating coil 36 may each have sensors configured to measure a travel speed or temperature along the work piece 32.

For further example, the welding power supply 12 may communicate a user selected welding process (i.e., a welding process selected by an operator through the user interface 20) to the induction power supply 38. More specifically, the control circuitry 54 of the welding power supply 12 may communicate the welding process selection to the control circuitry 62 of the induction power supply 38. Thereafter, the control circuitry 62 of the induction power supply 38 may modify any of a variety of operating parameters based on the user selected welding process. For example, the control circuitry 62 may begin or end the process, or regulate the frequency or amplitude of the alternating current provided to the induction heating coil 36 or the flow rate of a coolant through the transformer 42 and/or the induction heating coil 36 to achieve a desired maximum temperature of the induction heating coil 36 based on the welding process selected. More specifically, for a selected welding process, the processor 64 may retrieve configuration parameters for the selected welding process from the memory circuitry 66 and send the configuration parameters to the control circuitry 62. Similarly, the control circuitry 62 of the induction power supply 38 may send operating information or data to the control circuitry 54 of the welding power supply 12. For example, the control circuitry 62 may send temperature data (e.g., maximum temperature or real-time temperature) of the induction heating coil 36 to the control circuitry 54 of the welding power supply 12. Thereafter, the control circuitry 54 of the welding power supply 12 may adjust one or more operating parameters of the welding power supply and/or welding wire feeder 14 in response to the data received from the induction power supply 38. For example, the control circuitry 54 of the welding power supply 12 may begin or end the welding process or adjust the wire feed speed or torque of the welding wire feeder 14 based on the temperature data of the induction heating coil 36 received from the control circuitry 62 of the induction power supply 38. As will be appreciated, for higher temperatures provided by the induction heating coil 36 to the localized area 52 of the work piece 32 ahead of the welding arc 50, a slower wire feed speed may needed.

It should be noted that in certain embodiments, the power supplies and control circuits used for generation and control of induction heating power and welding power may be joined. That is, some or all of the circuits may be provided in a single power supply, and certain of the circuits may serve both functions (e.g., operator interface components). Additionally, a central controller may provide coordination and synchronization commands to both the welding/cutting system and the induction system.

It should also be noted that while reference is sometimes made in the present discussion to advancement or movement of the welding torch and adjacent induction heating system, depending upon the welding system design, the torch and induction heating system may indeed be displaced, while in other systems these may remain generally stationary, with the work piece or work pieces being moved. Such may be the case, for example, in certain robotic or automated operations, in submerged arc applications, and so forth. Both scenarios are intended to be covered by the present invention, and references to moving a torch and induction heating system should be understood to include any relative motion between these components and the work piece or work pieces.

Figure 3:
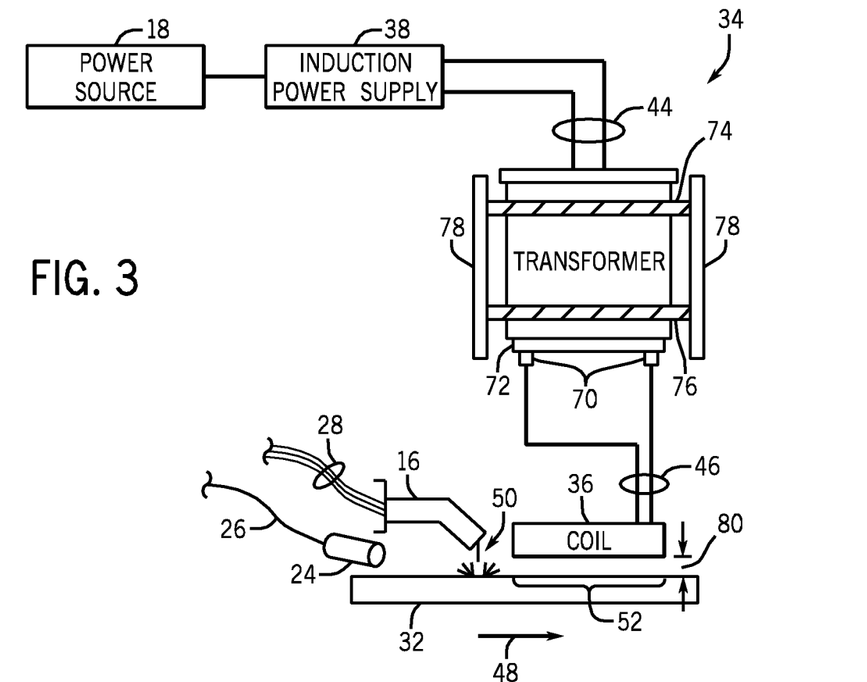
FIG. 3 is a block diagram illustrating exemplary functional components of the induction heating system of FIG. 1 in accordance with aspects of the present disclosure.

FIG. 3 is a schematic of an embodiment of the induction heating system 34 of FIG. 1, illustrating the induction power supply 38, the step-down transformer 42, and the induction heating coil 36 positioned ahead of the welding arc 50 produced by the welding torch 16. As discussed above, the transformer 42 is coupled to the induction power supply 38 by electrical wire conductors 44. The induction power supply 38 supplies an alternating current to the transformer 42 through the electrical wire conductors 44. For example, the alternating current may have a frequency from 5,000 Hz to 300,000 Hz, although other frequencies may be supplied as well. From the transformer 42, the alternating current is supplied to the induction heating coil 36 by electrical conductors 46. Specifically, the alternating current exits the transformer 42 through power connections 70 attached to a base 72 of the transformer 42. The electrical conductors 46 are coupled to the power connections 70, e.g., by soldering, brazing, or bolting. As mentioned above, the electrical conductors 46 may have a hollow core, thereby enabling a coolant to flow through the electrical conductors 46 and the induction heating coil 36 to regulate a maximum temperature of the induction heating coil 36. In other words, the electrical conductors 46 and the induction heating coil 36 may carry the alternating current and a coolant flow.

As shown, the transformer 42 is supported by a top plate 74 and a bottom plate 76. In certain embodiments, the top and bottom plates 74 and 76 may be formed from a ceramic or other electrically insulating material. The top and bottom plates 74 and 76 are further coupled to a metal frame 78. The metal frame 78 may be configurable such that a distance 80 between the work piece 32 and the induction heating coil 36 can be adjusted. The metal frame 78 may further be secured to a trolley or other mobile assembly configured to move and guide the induction heating system 34 in multiple planes along the weld joint of the work piece 32. Furthermore, the trolley or other mobile assembly may be coupled to the control circuitry 62 of the induction power supply 38 such that the control circuitry 62 may regulate the movement and speed of the induction heating coil 36 and entire induction heating system 34 relative to the work piece 32.

Figure 4:
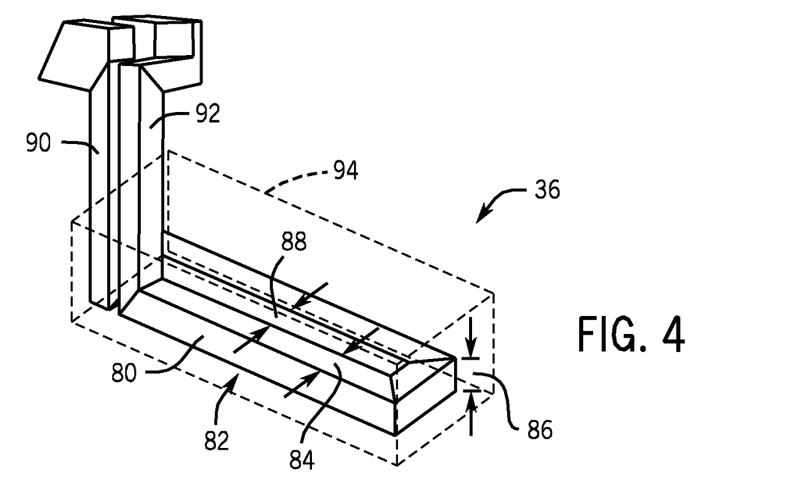
FIG. 4 is a perspective view of an exemplary induction heating coil configured to increase melting of a weld location ahead of the welding process.

FIG. 4 is a perspective view of an embodiment of the induction heating coil 36 shown in FIG. 3. In the illustrated embodiment, the induction heating coil 36 is made from square tubing 80 which forms one coil block 82 having a linear coil configuration. Specifically, the square tubing 80 has a width 84 that may be approximately 0.25", 0.5", 0.75", 1.0", or greater. As will be appreciated, because the induction heating coil 36 is formed from the square tubing 80, a height 86 of the induction heating coil 36 is equal to the width 84. Moreover, the coil block 82 formed by the square tubing 80 further forms a gap 88. For example, the gap 88 may be approximately 0.25", 0.5", 0.75", 1.0", or greater. In certain embodiments, coil block 82 may be formed such that the size of the gap 88 is equal to the width 84 of the square tubing 80. Furthermore, while the illustrated embodiment of the induction heating coil 36 is made from square tubing, other embodiments of the induction heating coil 36 may be made from tubing having other geometries (i.e., circular, oval-shaped, rectangular, or other polygonal-shaped tubing). Similarly, while the square tubing 80 in the illustrated embodiment of the induction heating coil 36 forms one coil block 82, other embodiments may have more than one coil.

In addition to the coil block 82, the square tubing 80 includes first and second coil posts 90 and 92 which are configured to couple to the electrical conductors 46. The first and second coil posts 90 and 92 receive the alternating current from the electrical conductors 46 and circulate the alternating current through the coil block 82 of the induction heating coil 36. Furthermore, the first and second coil posts 90 and 92 may receive a coolant flow from the electrical conductors 46. Specifically, the coolant may flow through the first and second coil posts 90 and 92 of the square tubing 80 and be routed through the coil block 82 of the square tubing 80. Furthermore, the induction heating coil 36 may be enclosed by an induction heating coil flux concentrator 94. For example, the induction heating coil flux concentrator 94 may be a box or other hollow structure formed from a material such as ferrite. Additionally, the induction heating coil flux concentrator 94 may be coated with a heat sink compound configured to transfer heat to the cooled elements of the coil.

Figure 5:
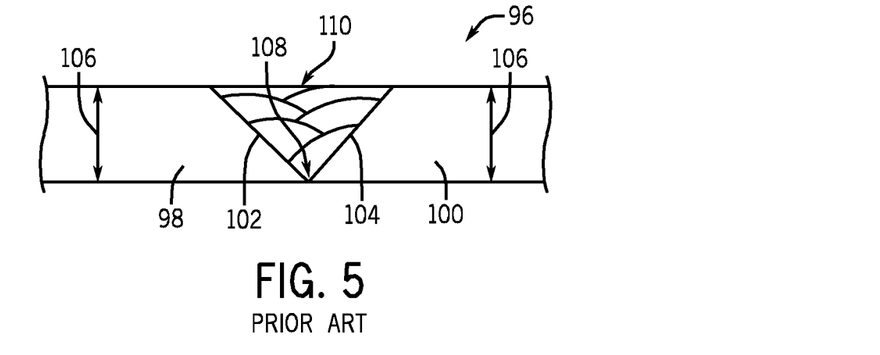
FIG. 5 is a schematic of a two beveled plates joined by a butt weld in accordance with a welding process known in the art.

FIG. 5 is a schematic of an embodiment of a butt weld joint 96 formed between a first plate 98 and a second plate 100 using a welding process known in the art. More specifically, an edge 102 of the first plate 98 is joined at an edge 104 of the second plate 100. As shown, the edges 102 and 104 of the first and second plates 98 and 100, respectively, are beveled. That is, the first and second plates 98 and 100 are machined prior to being joined and welded to form a beveled surface at the edges 102 and 104. As will be appreciated, for first and second plates 98 and 100 that are thicker (e.g., a thickness 106 of 0.5" or greater), the edges 102 and 104 may require preparation, such as beveling, before the plates 98 and 100 are welded together to ensure the desired weld quality and strength. Specifically, for thicker plates 98 and 100, the heat produced by the welding arc 50 may not be sufficient to bring the entire thickness 106 of the plates 98 and 100 to melting temperature. Consequently, the edges 102 and 104 of the plates 98 and 100 may be beveled to allow the welding arc 50 to penetrate the thickness of the plates 98 and 100. Additionally, the butt weld joint 96 may require several passes of the welding arc 50.

After preparation, the edges 102 and 104 of the plates 98 and 100 are joined together for welding. As shown, at the butt weld joint 96, the edges 102 and 104 of the plates 98 and 100 form a gap 108. During the welding operation, the gap 108 is filled with welding filler 110 (i.e., welding wire). For butt weld joints 96 having large or wide gaps 108, and or large bevels 102 and 104, ample welding filler 110 may be required to complete the weld, leading to an increase in costs for welding materials and a decrease in welding efficiency. Additionally, larger gaps 108 in butt weld joints 96 may further cause an increase in weld distortion (i.e., localized plastic deformation in the plates 98 and 100 near the butt weld joint 96).

Figure 6:
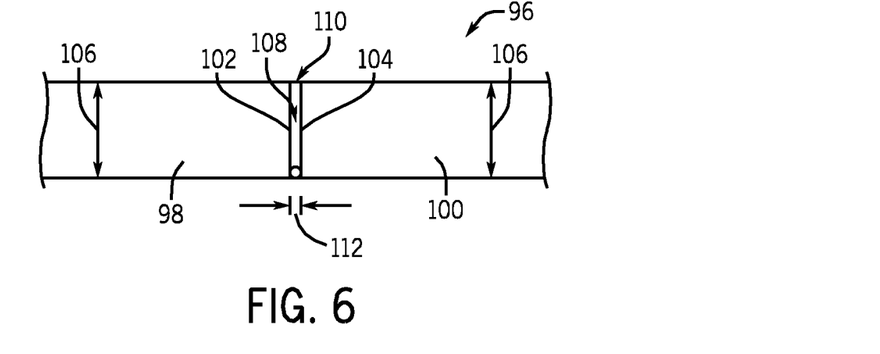
FIG. 6 is a schematic of two plates joined by a butt weld in accordance with aspects of the present disclosure.

FIG. 6 is a schematic of the butt weld joint 96 of FIG. 5 formed between the first plate 98 and the second plate 100 using a welding process having the induction heating system 34. As shown, the illustrated butt weld joint 96 is formed between the edges 102 and 104 of the plates 98 and 100. However, unlike the edges 102 and 104 shown in FIG. 5, the edges 102 and 104 in the illustrated embodiment are not beveled. In other embodiments, the edges 102 and 104 may be very slightly beveled. As discussed above, embodiments of the welding system 10 having the induction heating system 34 are able to raise the temperature of the localized area 52 of the work piece 32 in front of the welding arc 50 to a homologous temperature of approximately 0.5 or greater. The operation of the induction heating system 34 (i.e., the flow of eddy currents through the work piece 32) causes the plates 98 and 100 to increase in temperature more uniformly across the thickness 106 of the plates 98 and 100. As a result, less heat from welding arc 50 is needed to bring the entire thickness 106 of the plates 98 and 100 to melting temperature. Consequently, the gap 108 between the edges 102 and 104 may be very small, and little or no beveling of the edges 102 and 104 may be required. For example, the gap 108 may have a width 112 of approximately 0.15" or less. Therefore, a relatively small amount of welding filler 110 is needed to complete the butt weld joint 96. Because less welding filler 110 is needed to complete the butt weld joint 96, the welding process may be completed faster, and the butt weld joint 96 may experience less weld distortion.

As discussed above, embodiments of the present disclosure include an induction heating system 34 configured to heat the localized area 52 of a work piece 32 ahead of a welding arc 50. Specifically, the induction heating system 34 may raise the temperature of the localized area 52 to a homologous temperature of approximately 0.5 or greater. As a result, less heat from the welding arc 50 is needed to bring the weld joint of the work piece 32 to melting temperature. Because the induction heating system 34 is able to provide a substantial amount of heat to the localized area 52 of the work piece 32 just ahead of the traveling welding arc 50, the welding arc 50 may complete a weld joint at a faster speed. Similarly, less welding filler 110 is required to fill gaps 108 between plates 98, 100 or surfaces to be welded, leading to lower materials costs. As will be appreciated, the disclosed embodiments of the induction heating system 34 provide a relatively low cost and low maintenance auxiliary heating source for welding systems 10 to increase efficiency in a variety of welding and related processes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a welding power supply;
a wire feeder coupled to the welding power supply;
a welding torch coupled to the wire feeder and configured to output wire from the wire feeder to produce a welding arc based upon power from the welding power supply, the welding arc to form a weld at a gap between a first and a second work piece, the gap having a substantially even width through a thickness of the first and second work pieces; and
an induction heating system disposed adjacent to the welding torch, wherein the induction heating system comprises an induction heating supply an induction heating coil, a transformer, control circuitry, a processor, and a temperature sensor, wherein the processor is coupled to the control circuitry and memory circuitry configured to:
retrieve configuration parameters for the induction heating coil stored in the memory circuitry; and
send the configuration parameters to the control circuitry to apply appropriate control signals to the induction power supply to heat the workpiece via the induction heating coil,
wherein the control circuitry is coupled to the induction heating supply, the induction heating coil, the transformer, and the temperature sensor and configured to regulate operation of the induction heating system based on the configuration parameters to heat a localized area of a work piece ahead of the welding arc to a homologous temperature of at least 0.7 based on an input related to a temperature of the work piece detected by the temperature sensor and received by the control circuitry, such that the heat from the induction heating system and heat from the welding arc provide a consistent temperature profile through the thickness of the first and second work pieces during an arc welding process, wherein heat corresponding to the temperature profile is sufficient to melt the first and second work pieces and the wire.

2. The welding system of claim 1, wherein the induction power supply is configured to generate an alternating current, wherein the transformer is coupled to the induction power supply, and wherein the induction heating coil is coupled to the transformer and configured to receive the alternating current and induce eddy currents in the work piece.

3. The welding system of claim 2, wherein the induction power supply is coupled to the welding power supply, and the control circuitry is configured to apply the control signals to the induction power supply based upon operating parameters of the welding power supply, the welding wire feeder, or both.

4. The welding system of claim 3, wherein the operating parameters comprise a voltage output of the welding power supply, a current output of the welding power supply, a wire feed speed of the welding wire feeder, or a combination thereof.

5. The welding system of claim 2, wherein the induction heating coil comprises hollow tubing.

6. The welding system of claim 2, wherein the induction heating coil comprises a linear coil configuration.

7. The welding system of claim 2, wherein the induction heating system comprises an induction heating coil flux concentrator disposed about the induction heating coil.

8. The welding system of claim 2, wherein the induction heating system comprises a cooling system configured to regulate the temperature of the transformer, the induction heating coil, or both.

9. The welding system of claim 8, wherein the cooling system comprises a liquid coolant configured to flow through the transformer, the induction heating coil, or both.

10. The welding system of claim 2, comprising a mobile assembly configured to support and move the induction heating system independently from and adjacent to the welding torch, translate the induction heating coil in the direction of the weld, control the height of the induction heating coil above the welding work piece, or a combination thereof.

11. The welding system of claim 1, wherein the control circuitry is configured to regulate operation of the induction heating system to heat the localized area of a work piece ahead of the welding arc to a homologous temperature of at least 0.85.

12. An auxiliary welding heating system, comprising:
an induction power supply configured to generate an alternating current;
a step-down transformer coupled to the induction power supply;

an induction heating coil disposed adjacent to a welding torch, coupled to the step-down transformer and configured to receive the alternating current from the induction power supply;
a temperature sensor;
control circuitry coupled to the temperature sensor, a processor, a memory circuitry, and the induction power supply, wherein the
processor is configured to:
retrieve configuration parameters for the induction heating coil stored in the memory circuitry; and
send the configuration parameters to a control circuitry to apply appropriate control signals to the induction power supply to heat the workpiece via the induction heating coil, wherein the control circuitry is configured to regulate operation of the induction power supply, the step-down transformer, or the induction heating coil based on the configuration parameters to induce eddy currents in a welding work piece to heat the welding work piece before an advancing welding arc to a temperature of at least 70 percent of a melting temperature of a material of the work piece based on a first input related to an actual temperature of the work piece detected by the temperature sensor and received by the control circuitry.

13. The auxiliary welding heating system of claim 12, wherein the control circuitry is configured to regulate operation of the induction power supply, the step-down transformer, or the induction heating coil to heat the welding work piece before the advancing welding arc to a temperature of at least 85 percent of the melting temperature of the material of the work piece.

14. The auxiliary welding heating system of claim 12, wherein the induction heating coil is disposed ahead of the welding torch in the direction of a weld.

15. The auxiliary welding heating system of claim 12, wherein the induction heating coil is disposed ahead of a plasma cutter in the direction of a cut.

16. The auxiliary welding heating system of claim 12, wherein the induction heating coil is disposed behind the welding torch in the direction of a weld, and the auxiliary welding heating system is configured to apply a heat treatment to the work piece.

17. The welding system of claim 10, wherein the control circuitry is coupled to a first travel speed sensor and a second travel speed and further configured to:
receive an input from the first travel speed sensor corresponding to a travel speed of the welding torch along the gap;
receive an input from the second travel speed sensor corresponding to a travel speed of the induction heating coil along the work piece; and
adjust the travel speed of the induction heating coil based on a measured travel speed of the welding torch and a measured travel speed of the induction heating coil.

18. The welding system of claim 1, wherein the welding power supply is coupled to a second temperature sensor and configured to regulate power to the welding torch based on the temperature of the work piece detected by the second temperature sensor to provide a consistent temperature profile through the thickness of the first and second work pieces during an arc welding process.

19. The welding system of claim 1, wherein the welding work piece comprises a first and a second work pieces arranged with a gap between the first and second work pieces, the gap having a substantially even width through a thickness of the first and second work pieces.

* * * * *